United States Patent
Kolvick et al.

(10) Patent No.: US 8,909,957 B2
(45) Date of Patent: Dec. 9, 2014

(54) DYNAMIC VOLTAGE ADJUSTMENT TO COMPUTER SYSTEM MEMORY

(75) Inventors: Randolph S. Kolvick, Durham, NC (US); Mohamad H. Tawil, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 693 days.

(21) Appl. No.: 12/939,305

(22) Filed: Nov. 4, 2010

(65) Prior Publication Data

US 2012/0117397 A1 May 10, 2012

(51) Int. Cl.
  *G06F 1/32* (2006.01)
  *G06F 1/04* (2006.01)
  *G06F 1/26* (2006.01)

(52) U.S. Cl.
  CPC .............. *G06F 1/324* (2013.01); *G06F 1/3296* (2013.01); *Y02B 60/1225* (2013.01); *G06F 1/3275* (2013.01)
  USPC ............................ 713/320; 713/300; 713/600

(58) Field of Classification Search
  CPC ................ G06F 1/32; G06F 1/26; G06F 1/04
  USPC ......................................... 713/320, 300, 600
  See application file for complete search history.

(56) References Cited

U.S. PATENT DOCUMENTS

| | | | |
|---|---|---|---|
| 5,545,974 A | 8/1996 | Trainor et al. | |
| 5,559,966 A * | 9/1996 | Cho et al. | 710/105 |
| 5,901,103 A | 5/1999 | Harris, II et al. | |
| 5,909,696 A * | 6/1999 | Reinhardt et al. | 711/144 |
| 7,051,218 B1 | 5/2006 | Gulick et al. | |
| 7,257,040 B2 | 8/2007 | Chen | |
| 7,308,590 B2 | 12/2007 | Zagacki | |
| 7,404,095 B2 | 7/2008 | Brown et al. | |
| 7,451,332 B2 | 11/2008 | Culbert et al. | |
| 7,653,834 B2 | 1/2010 | Mangione-Smith | |
| 2005/0237823 A1 | 10/2005 | Aitken et al. | |
| 2006/0129854 A1* | 6/2006 | Schnepper | 713/300 |
| 2006/0280018 A1* | 12/2006 | Cases et al. | 365/226 |
| 2007/0220388 A1* | 9/2007 | Quereshi et al. | 714/731 |
| 2007/0234100 A1* | 10/2007 | Baker et al. | 713/600 |
| 2009/0016140 A1* | 1/2009 | Qureshi et al. | 365/227 |
| 2010/0017042 A1 | 1/2010 | Lopata | |
| 2010/0250981 A1* | 9/2010 | Pamley et al. | 713/320 |
| 2011/0246713 A1* | 10/2011 | Bains | 711/106 |

OTHER PUBLICATIONS

"CPU Throttling Definition from PC Magazine Encyclopedia." CPU Throttling Definition from PC Magazine Encyclopedia. The Computer Language Company Inc., n.d. Web. Dec. 14, 2013.*

* cited by examiner

*Primary Examiner* — Mohammed Rehman
*Assistant Examiner* — Terrell Johnson
(74) *Attorney, Agent, or Firm* — Katherine S. Brown; Jeffrey L. Streets (57) ABSTRACT

A system and method are provided wherein the voltage to a random access memory system may be automatically, dynamically adjusted without requiring an operating system to be restarted. In one embodiment, a target value of a voltage supplied to the memory system is dynamically selected. A system management mode is invoked in response to a change in the dynamically selected target value, including suspending a normal operation of the memory system. While in the system management mode, the voltage supplied to the memory system is adjusted according to the changed target voltage. A memory speed is adjusted according to the changed target value of the voltage. These steps are performed without restarting the computer system. The system management mode is exited and normal operation of the memory system may resume at the changed target voltage.

18 Claims, 3 Drawing Sheets

DYNAMIC VOLTAGE ADJUSTMENT TO COMPUTER SYSTEM MEMORY

BACKGROUND

1. Field of the Invention

The present invention relates to computer system memory, and more particularly to controlling a voltage supplied to computer system memory.

2. Background of the Related Art

Modern server systems are being configured with increasingly powerful memory systems. The increase in server memory capacity is being achieved, in part, by both advances in memory module technology and the ability of system boards to support a large number of memory modules. The system boards of a modern server may have connections to support many DIMMs (dual in-line memory modules), for up to several terabytes (TB) of DDR3 (double-data-rate three) memory. The power and performance capabilities of memory systems are continuously under development. As a result of these trends, the voltage at which DIMMs are operated more significantly affects the power consumption and performance of the entire server.

One advance in memory module technology is the development of DIMMs operable at a lower voltage. Another advance in memory module technology is the ability of a given set of DIMMs to be operable at multiple voltages. For example, DDR3 SDRAM (double-data-rate three synchronous dynamic random access memory), which originally operated at 1.5V, now includes a DDR3L variant capable of operating at either 1.35V or 1.5V. In operating a computer system with a memory system having multiple voltage settings, a user is conventionally prompted to select a desired voltage when the computer is starting up. The user must reboot the system in order to select a different voltage.

BRIEF SUMMARY

One embodiment of the present invention provides a method of controlling memory in a computer system. The method includes operating the memory at a first performance level comprising a first memory voltage and a first memory speed. A second performance level, comprising a second memory voltage and a second memory speed, is dynamically selected. Normal operation of the memory is suspended, during which the memory voltage is adjusted to the second memory voltage and the memory speed is adjusted to the second memory speed. The normal operation of the memory system is then resumed at the second performance level without restarting the computer system. In a related embodiment, the method may be implemented by software according to a computer program product embodiment. The software may include a power management policy module defining parameters for dynamically selecting a voltage, which may be performed on a system without requiring a system restart.

Another embodiment of the invention provides a computer system that includes an operating system, a memory system, a voltage regulator, and a system management module. The memory system comprises one or more memory modules, and is operable over a voltage range. The voltage regulator is configured for supplying the voltage to the memory system over the voltage range. The system management module is in communication with the voltage regulator and is configured for dynamically selecting a target value of the voltage according to one or more dynamic power management variables, temporarily suspending a normal operation of the memory system in response to a changed target value, and adjusting an output of the voltage regulator to the changed target value while in the temporarily suspended operation of the memory system without rebooting the operating system.

DETAILED DESCRIPTION

Embodiments of the invention include a system and method for dynamically changing the voltage supplied to computer system memory. The voltage supplied to a memory system may now be changed without requiring a full system restart. According to the disclosed embodiments, the target voltage to be supplied may be dynamically selected according to a power management policy. In response to either an upward or downward change in the target voltage, normal operation of the memory system may be temporarily suspended. For example, an SMI (system management interrupt) may be generated to invoke a system management mode to suspend the operation of the operating system in a memory region, and the memory system may be placed in a self-refresh mode so that a memory controller may be temporarily disabled. Then, the voltage may be adjusted to the new target value, optionally using incremental voltage adjustments followed by defined waiting periods until the changed target voltage is reached. Normal operation of the memory and operating systems may be resumed once the voltage has been adjusted.

The system may also set a new memory speed in conjunction with the new memory voltage. For example, the BIOS (basic input/output system) firmware may be requested to set a higher memory speed that corresponds with a higher memory voltage, or a lower memory speed that corresponds with a lower memory voltage. After the new memory voltage has been reached and the new memory speed has been set, the BIOS firmware restarts the memory controller and exits the SMI. The memory system is then operable at the new power and performance level without a full system restart.

The ability to adjust the memory voltage and speed without a system restart allows the voltage and speed changes to be made on-the-fly. Because no system restart is required, these dynamic memory system voltage adjustments may then be performed automatically according to power management policy. For example, according to a user-definable power management policy, the voltage to the memory system may be increased as desired to increase system performance, and may be subsequently decreased to reduce power consumption when the higher performance level is no longer needed.

Figure 1:
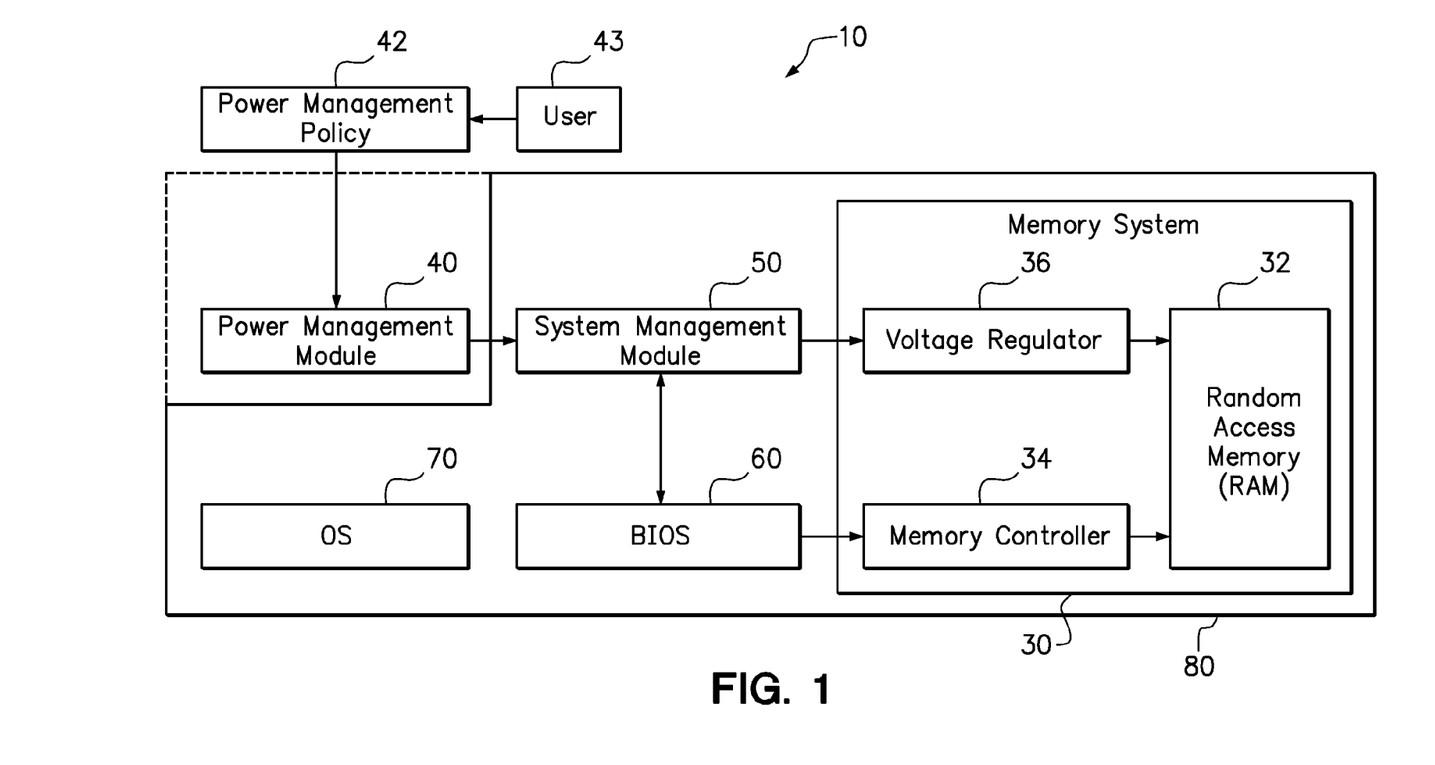
FIG. 1 is a system diagram of a computer system in which the voltage of a memory system may be dynamically adjusted without requiring a system reboot.

FIG. 1 is a system diagram of a computer system 10 according to an embodiment of the invention, in which the voltage of a memory system 30 may be automatically, dynamically adjusted without restarting the computer system 10. The memory system 30 resides on a computer 80 to be managed, along with a system management module 50, BIOS 60, and operating system (OS) 70. The power management module 40 may include power management software on a computer usable storage medium, either residing on the managed computer 80 or on a remote computer networked with the managed computer 80, for managing the allocation of power to the managed computer 80. For example, as discussed further below in connection with the embodiment of FIG. 3, the managed computer 80 may be a particular server in a datacenter, and the power management module 40 may reside on a management console for administrating any number of servers in that datacenter.

The power management module 40 governs the allocation of power to the managed computer 80. The memory system 30 includes RAM (random access memory) 32, a memory controller 34, and a voltage regulator 36. The memory controller 34 manages the flow of data going to and from the RAM 32. The voltage regulator 36 controls the voltage supplied to the RAM 32. The system management module 50 may include system management software residing a computer usable storage medium. The system management module 50 is in communication with the voltage regulator 36, and dynamically selects a target voltage to be supplied by the voltage regulator 36, in satisfaction of the constraints of the power management module 40. The BIOS 60 is separate from the OS 70 and is used to facilitate changing the voltage without restarting the OS 70. The details and operation of each of these system components will be described in further detail below.

The RAM 32 resides on a machine to be managed, such as on a particular server in a datacenter. As generally understood in the art, the RAM 32 is a form of computer memory that includes hardware for digitally storing data that can be "randomly" accessed, i.e. accessed regardless of the physical location of the accessed data on the RAM 32. Typically, RAM 32 is volatile memory, which retains the digitally-stored data while in a powered-on state, but which very quickly lose the digitally-stored data when not receiving power. However, new types of non-volatile RAM being explored, which preserve data while powered down, are also within the scope of the invention. The various solid-state architectures available for use with the RAM 32 allow for fast storage and retrieval in comparison with other types of computer storage such as a hard-disk drive (HDD). Computer executable program code included with software may be selectively loaded from long-term storage to RAM 32 for execution.

The OS 70 is software, consisting of programs and data, that manages the computer hardware and provides common services for efficient execution of various application software. For hardware functions such as input and output and memory allocation, the operating system acts as an intermediary between application programs and the computer hardware. While application code is usually executed directly by the hardware, the hardware may call the OS 70 or be interrupted by the OS 70. The OS 70 is started during a process referred to as "booting up" or simply "booting." A boot sequence is the initial set of operations that the computer performs when power is switched on. A computer generally boots up automatically whenever the computer is started or restarted. Thus, removing power from the computer temporarily may be done to reboot the system. A soft reboot refers to restarting a computer under software control, without removing power, and is an orderly shutdown and restarting of the computer. A hard reboot is when power to a computer is cycled off and on, or a reset signal to a processor is otherwise triggered.

In IBM PC compatible computers, the BIOS is a standard defining a firmware interface. In a PC, the BIOS is software built into the PC and is typically the first code run by a computer when powered on. The original BIOS is now a legacy system that is still included on some systems. In modern server technologies, the BIOS 60 is more commonly based on EFI (Extensible Firmware Interface), which may still be referred to in the art as BIOS. EFI-based BIOS in a server is generally more complex than BIOS in a PC, however, and supports extensive error handling and features versus the BIOS in a PC. EFI groups together hardware reference code from many different suppliers, and performs hardware initialization and control. The BIOS 60 may be stored on a Flash memory chip on a system board of a server. Alternatively, the BIOS 60 may be embodied on another type of ROM (read-only memory) chip. The BIOS 60 may also serve as an intermediary between a microprocessor and I/O device control information and data flow.

The memory controller 34 is a digital circuit that manages the flow of data going to and from the RAM 32. The memory controller 34 can be embodied on its own, separate chip, or integrated into another chip, such as on the die of a microprocessor. Memory controllers contain the logic necessary to read and write to DRAM (dynamic random access memory modules) included with RAM 32, and to continuously "refresh" the RAM 32. Refreshing the RAM 32 ensures that capacitors associated with data storage retain their data, as the capacitors would otherwise leak their charge within a fraction of a second. The refresh rate may be dictated by standards promulgated by a standards body, such as JEDEC (the Joint Electron Devices Engineering Council).

The system diagram of FIG. 1 provides an upper-level overview of how the major components of the computer system 10 may cooperate to dynamically control the voltage to the RAM 32. According to one mode of use, a user 43 such as a system administrator, provides a power management policy 42 to the power management module 40. The power management policy 42 may define the voltage to be provided to the RAM 32 according to one or more dynamic power management variables. The dynamic power management variables may include variable performance, efficiency, and cost parameters. For instance, a performance objective specified in the power management policy 42 may at times require the RAM 32 to be operated at a higher speed and voltage. An efficiency or cost-related parameter may at other times require that the RAM 32 be operated at a lower speed and voltage so that the managed computer 80 may be operated within particular monetary or power budget constraints. One example of a variable power management parameter is the cost of power, which may fluctuate over the course of a day, a week, or other unit of time. At times of peak cost, the power management policy 42 may dictate that the RAM 32 operate at a lower voltage and speed. The power management module 40 may communicate the power management policy 42 to the system management module 50.

The system management module 50 dynamically selects a voltage to be provided to RAM 32 that complies with power management policy 42. The system management module 50 dynamically adjusts a target voltage to be enforced by the voltage regulator 36. When the system management module 50 determines a target voltage adjustment is needed, the system management module 50 generates a request for the voltage adjustment. For example, if the target voltage increases, the system management module 50 requests a voltage increase. The normal operation of the memory system 30 and the operating system 70 may be suspended in a memory region by generating a system management interrupt (SMI), which invokes a System Management Mode (SMM). In the illustrated example embodiment, the power management module 40 makes this request to the system management module 50. Alternatively, the system management module 50 may request the OS 70 or hypervisor to suspend normal memory operation, which would also generate an SMI. In the latter case the request would be made through the OS 70, which would pass the request through the BIOS 60 to the system management module 50 via the Advanced Configuration and Power Interface (ACPI) standard. The SMI wakes up BIOS to request the OS 70 quiesce the RAM 32 so that the memory can be placed in self-refresh mode.

The system management module 50, which is in communication with the BIOS 60, then requests the BIOS 60 to place the RAM 32 into self-refresh mode. During self-refresh mode, the RAM 32 uses an on-chip timer to generate internal refresh cycles as necessary. The self-refresh mode allows the memory controller 34 to be disabled entirely. The system clock may also be stopped during this time. The BIOS 60 confirms that self-refresh mode has been invoked.

In System Management Mode, the system management module 50 may adjust the output of the voltage regulator 36 toward the changed target voltage. The system management module 50 makes this adjustment by increasing the voltage regulator output in the case of an increased target voltage, or decreasing the voltage regulator output in the case of a decreased target voltage. Optionally, the system management module 50 makes this adjustment incrementally, such as by increasing the voltage a predefined voltage increment, waiting for a predefined time interval, and again increasing the voltage by the predefined voltage increment, until the target voltage is reached. The DIMM voltage may be moved in multiple increments instead of one large voltage jump, to ensure memory reliability. While DDR3L DIMMs are conventionally rated to work at both 1.5V and 1.35V, the reliability of dynamically changing between the two voltages is facilitated when performed in steps.

The system management module 50 then requests the BIOS 60 to adjust the memory speed according to the changed voltage. Generally, higher memory speeds require higher voltages, and vice-versa. The relationship between voltage and memory speed may be empirically determined for a particular system. After adjusting the memory speed, the BIOS 60, which is in communication with the memory controller 34, restarts the memory controller 34 and exits system management mode. At that point, normal operation of the OS and the RAM 32 may be resumed, wherein the RAM 32 may be operated at the changed voltage.

Figure 2:
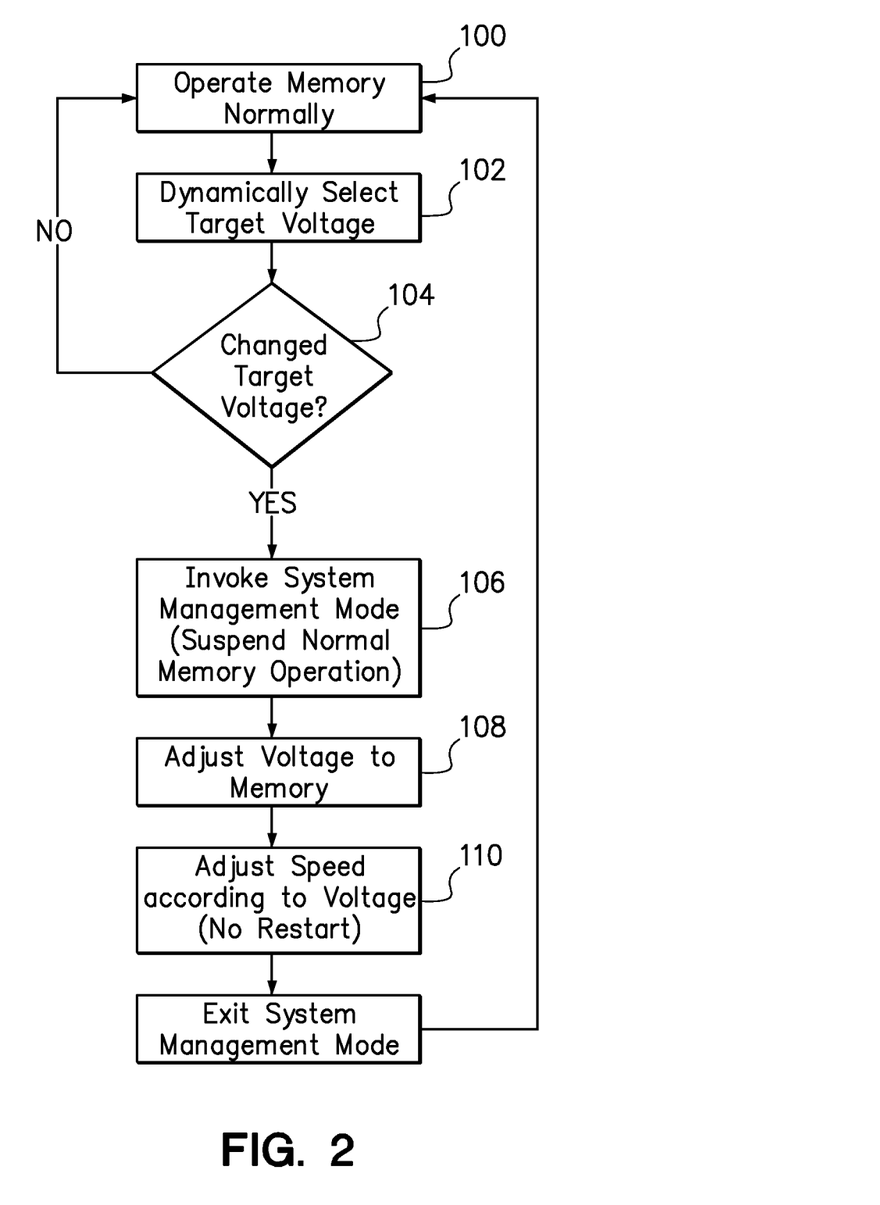
FIG. 2 is a flowchart outlining a method of controlling a voltage to random-access memory of a computer system, such as the computer system of FIG. 1

FIG. 2 is a flowchart outlining a method of controlling a voltage to random-access memory of a computer system, such as in the computer system 10 of FIG. 1. In step 100, system memory is operated normally. Normal operation of the memory includes selectively reading and writing to RAM, and using a memory controller to generate refresh cycles. Step 102 is to dynamically select a target voltage to be supplied to the memory. The target voltage may be dynamically selected according to a power management policy 42. As the target voltage is dynamically selected, any changes in the target voltage may occur at any time. The system may be operated for an extended period of hours or even days until a changed power management variable occurs, such as the cost of power increasing during peak demand. The voltage adjustments will be performed as often as power management policy dictates. However, for reliability reasons, the voltage is preferably not changed more frequently than necessary. The voltage may be changed only a few times per day, consistent with power management policy. For example, in a given 24-hour cycle, the voltage may be changed once, between 1.5V for busy periods (high load conditions) and 1.35V for less busy periods (low load conditions). Conditional step 104 is to determine when the target voltage has changed. As long as no change in the target voltage has been made, the memory may continue to be operated normally per step 100.

In response to a change in the target voltage according to conditional step 104, a system management mode (SMM) is invoked according to step 106. The SMM may be invoked, for example, by generating an SMI. A voltage adjustment is then made according to step 108. The voltage change may be performed incrementally while remaining in the SMM, as described above. After the voltage has been changed to the new target voltage, a memory speed is adjusted according to the changed voltage 110. For example, the memory speed will typically be increased in step 110 by an empirically-determined amount in response to a voltage increase having occurred in step 108, or decreased by an empirically-determined amount in response to a voltage decrease having occurred in step 108.

In step 112, after the voltage has been adjusted (step 108) and the memory speed has been adjusted accordingly (step 110), the system management mode is exited. After system management mode has been exited, normal operation of the memory system may resume in step 100, at the newly-changed voltage.

As stated above, the rate of occurrence of the voltage changes may be dictated by power management policy. Accordingly, an embodiment of the invention may further be directed to, or include, power management policy software optimized for dynamically changing the voltage without a system restart according to the various techniques disclosed herein. The power management policy software communicates with one or more of the system management software, the system firmware (i.e. BIOS), and the operating system to implement the selected memory voltage and performance levels.

Figure 3:
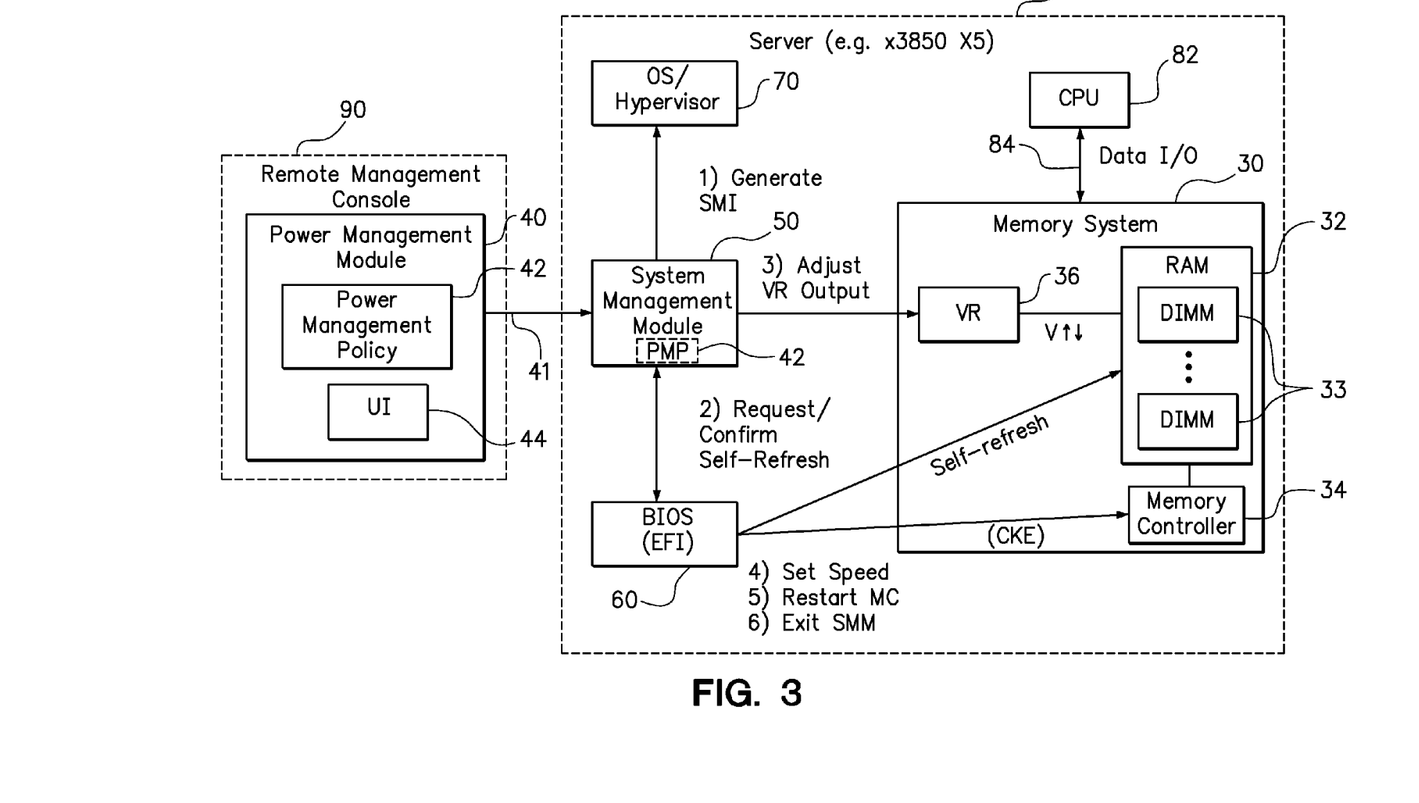
FIG. 3 is a schematic diagram of the system of FIG. 1 according to a specific example embodiment of the invention wherein the memory system resides on a server being remotely managed by a remote management console.

FIG. 3. is a schematic diagram of the system 10 of FIG. 1 according to a specific example embodiment, wherein the managed computer 11 of FIG. 1 comprises a server 80 being remotely managed by a remotely-located power management console (i.e. "remote management console") 90. Many of the system components such as the memory system 30, BIOS 60, OS 70, system management module 50, and a CPU 82 reside on a system board of the server 80. The various electronic components on the system board are in electronic communication over electrical pathways such as traces etched on the system board, as generally understood in the art. The power management module optionally resides on the remote management console 90. The remote management console 90 is in communication with the server 80 over a network connection 41, such as Ethernet or the Internet, as also generally understood in the art.

With reference to the memory system 30, the RAM 32 includes one or more DIMMs 33. The DIMMs 33 each contain a plurality of DRAM modules. The DIMMs 33 may be, for example, DDR3 SDRAM. DDR3 SDRAM is a random access memory interface technology used for high bandwidth storage of the working data of a computer or other digital electronic device. DDR3 is part of the SDRAM family of technologies and is one of the many DRAM implementations. DDR3 is a DRAM interface specification. The actual DRAM arrays that store the data are the same as in any other type of DRAM, and have similar performance.

The DIMMs 33 are operable over a range of voltages. For example, the DIMMs 33 may be DDR3L, which is specified by JEDEC, or a modification thereof adapted specifically for use with the present embodiment. While DDR3 SDRAM is conventionally operated at 1.5V, DDR3L is additionally operable at a reduced voltage of 1.35V, which enables a power savings in many mainstream applications. JEDEC standard DDR3 may include a Serial Presence Detect (SPD) device, an Electrically Erasable Programmable Read-Only Memory (EEPROM) readable over an SMbus (System Management Bus), that informs the host system of the capabilities and characteristics of the DIMM 33, including the supply voltages. While type DDR3L SDRAM is given as an example of a DIMM operable at multiple voltages, other DIMMs within the scope of this embodiment may be operable at other voltages or voltage ranges other than just 1.35V and 1.5V. As described herein, this operability of the DIMMs 33 at a range of supply voltages allows the system management module 50 to dynamically select a target voltage. The target voltage may be supplied by a variable-output voltage regulator 36, such as the Volterra VT1115.

The system management module dynamically selects the voltage supplied to the memory system 30 to optimize the power consumption and performance of the server 80. The system management module 50 may alternatively be referred to as a server management module in this instance, wherein the memory system 30 to be controlled resides on the system board of the server 80. The system (or server) management module 50 may include a service processor on the server 80 that may also perform conventional power management tasks, such as monitoring the power consumption of the server 80 and throttling the CPU 82 and RAM 32. The system management module 50 may be an integrated management module (IMM).

The power management module 40 is optionally included on the remote management console 90. The remote management console 90 may be networked with the server 80 from a location outside the datacenter. For example, the system management module 50 may include an IMM, having a dedicated network port and providing remote browser access to the server 80 by the remote management console 90. The system management module 50 allows the user 43 (FIG. 1) to monitor critical server components, remotely control power using the power management module 40, and selectively upgrade firmware of server 80 components. This remote management functionality may be provided, by way of example and not by limitation, using an IMM web interface or IBM Systems Director. Various power management features may be handled by a plug-in module, such as an IBM Systems Director Active Energy Manager plug-in, which interacts with the IMM.

A user-configurable power management policy 42 governs how the power management module 40 manages power to the server 80. In particular, the power management policy 42 may define the voltage to be supplied to the memory system 30 according to one or more dynamic power management variables. A user interface (UI) 44 included with the power management module 40 allows a user (e.g. a system administrator) to input and configure the power management policy 42. The power management policy 42 may be communicated to the system management module 50 as indicated. The power management policy 42 may specify one or more variable power management parameters, such as variable datacenter and chassis power budgets. Such power budgets may require power limits to be imposed that vary over time, such as based on the variable cost of power. Because the power consumption of the server 80 depends in part on the voltage at which the memory system 30 operates, the power management module 40 may dynamically select a voltage that satisfies performance objectives while remaining in compliance with the variable power management parameters.

The memory system 30 operates normally between voltage changes. During a normal operation of the memory system 30, a central processing unit ("CPU") 82 reads and writes to the RAM 32 over a bus 84. A memory controller 34, such as a Westmere EX Millbrook2, controls this flow of data (Data I/O) between the CPU 82 and the RAM 32. Also during normal operation, the memory controller 34 refreshes the RAM 32 to preserve the data presently stored. During a normal operation of the operating system (OS) 70, software applications are allowed to execute and selectively access hardware, such as to read and write data to the memory system 30.

The system management module 50 initiates a series of actions, with the assistance of the BIOS 60 in response to a change in a target value of the voltage to be supplied by the voltage regulator 36. A first action taken by the system management module 50 is to suspend the normal operation of the OS 70 and memory system 30 by generating an SMI. The SMI causes the OS 70 to enter a System Management Mode (SMM), during which normal operation of the OS 70 is suspended. Next, the system management module 50 requests the BIOS 60 to place the memory system 30 in self-refresh mode. To invoke self-refresh mode, a clock enable (CKE) input may be lowered at the same time as the self-refresh command is sent to the RAM 32. The BIOS 60 confirms the self-refresh mode to the system management module 50, which is then able to proceed with adjusting the output of the voltage regulator 36 to the changed target value.

The target value of the voltage is dynamically selected from a voltage range over which the RAM 32 is operable. The voltage range of the voltage regulator 36 is preferably matched to this voltage range. For example, if the RAM 32 is operable over a range of from 1.0V to 1.5V, then the voltage regulator 36 is preferably operable over at least the range of between 1.0 and 1.5V. The voltage regulator 36 may be adjustable, so that the voltage may be incrementally adjusted over small, defined voltage increments. In adjusting the output of the voltage regulator 36, the system management module 50 may adjust the voltage by a plurality of voltage increments or decrements toward the changed target voltage until the changed target voltage is reached. The system management module 50 may also wait a predefined time interval between each voltage increment or decrement. For example, if the voltage is to be decreased from 1.35V to 1.5V, the system management module 50 may increase the output of the voltage regulator 36 by an increment of 25 mV, wait a predefined time interval of 100 µs, and repeat these two steps five times until the changed target voltage of 1.5V is reached.

After the changed target voltage is reached, the system management module 50 then instructs the BIOS 60 to proceed with adjusting the speed of the memory controller 34. The BIOS 60 sets the new speed according to the adjusted voltage. The BIOS 60 then restarts the memory controller 34 so that normal operation of the MC may resume. The BIOS 60 also exits the system management mode so that normal operation of the OS may resume. The memory system 30 is now operated at the newly changed output of the voltage regulator 36. This process may occur automatically, without the disruption of a full system restart. This process may also be automated, occurring seamlessly from the perspective of a user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and

What is claimed is:

1. A method of controlling random-access memory m a computer system, the method comprising:
operating the memory at a first memory voltage and a first memory speed;
dynamically selecting a second memory voltage and a second memory speed;
suspending normal operation of the memory by invoking a system management mode of the computer system;
while memory operation is suspended, adjusting the memory voltage to the second memory voltage by a plurality of voltage increments toward the second memory voltage until the second memory voltage is reached;
adjusting the memory speed to the second memory speed; and
resuming the normal operation of the memory system at the second memory voltage and second memory speed without restarting the computer system.

2. The method of claim 1, wherein invoking the system management mode comprises generating a system management interrupt.

3. The method of claim 1, wherein the step of resuming the normal operation of the memory comprises exiting the system management mode.

4. The method of claim 1, further comprising:
waiting a predefined time interval between each voltage increment.

5. The method of claim 1, further comprising:
dynamically selecting the second memory voltage according to a power management policy that defines the second memory voltage to be selected according to one or more power management variables.

6. The method of claim 1, further comprising:
maintaining the memory system in an automatic refresh mode while in the system management mode, the automatic refresh mode including generating refresh cycles from within the memory system to preserve volatile data stored in the memory system.

7. The method of claim 1, wherein the second memory voltage is dynamically selected from a group of discrete values.

8. The method of claim 7, wherein the group of discrete values comprise a first value of about 1.35 volts and a second value of about 1.5 volts.

9. The method of claim 1, further comprising:
after operating the memory at the second memory voltage and second memory speed, returning to the first memory voltage and first memory speed by:
dynamically selecting the first memory voltage and first memory speed;
suspending normal operation of the memory;
while memory operation is suspended, adjusting the memory voltage to the first memory voltage and adjusting the memory speed to the first memory speed; and
resuming the normal operation of the memory system at the first memory voltage and first memory speed without restarting the computer system.

10. A computer system, comprising:
an operating system;
a memory system comprising one or more memory modules, the memory system operable over a voltage range;
a voltage regulator configured for supplying the voltage to the memory system over the voltage range; and
a system management module in communication with the voltage regulator and configured for dynamically selecting a target value of the voltage according to one or more dynamic power management variables, temporarily suspending a normal operation of the memory system in response to a changed target value until the changed target voltage is reached, and adjusting an output of the voltage regulator to the changed target value by adjusting the voltage by a plurality of voltage increments or decrements toward the changed target voltage while in the temporarily suspended operation of the memory system without rebooting the operating system.

11. The system of claim 10, further comprising:
a memory controller included with the memory system and configured for managing a flow of data to and from the one or more memory modules; and
a basic input/output system (BIOS) in communication with the memory controller and configured in part for controlling a memory speed according to the voltage supplied by the voltage regulator.

12. The system of claim 10, further comprising:
the system management software is configured to request an automatic refresh mode in response to the changed target value; and
the BIOS is configured to implement the automatic refresh mode in response to the request from the system management software, including generating refresh cycles from within the memory system to preserve volatile data stored in the memory system.

13. The system of claim 11, wherein the BIOS comprises an extensible firmware interface (EFI).

14. The system of claim 10, further comprising:
a power management module including a user-interface for inputting a power management policy, the power management policy defining the target value to be selected according to one or more power management variables.

15. A computer program product including computer usable program code embodied on a non-transitory computer usable storage medium, the computer program product comprising computer usable program code for controlling random-access memory in a computer system, the computer program product comprising:
computer usable program code for operating the memory at a first memory voltage and a first memory speed;
computer usable program code for dynamically selecting a second memory voltage and a second memory speed;
computer usable program code for suspending normal operation of the memory by invoking a system management mode of the computer system;
computer usable program code for, while memory operation is suspended, adjusting the memory voltage to the second memory voltage by a plurality of voltage increments toward the second memory voltage until the second memory voltage is reached;
computer usable program code for adjusting the memory speed to the second memory speed; and
computer usable program code for resuming the normal operation of the memory system at the second memory voltage and second memory speed without restarting the computer system.

16. The computer program product of claim 15, further comprising:

computer usable program code defining a power management policy for dynamically selecting the second memory voltage according to one or more power management variables.

17. The computer program product of claim 16, wherein the power management variables include a variable, time-dependent performance, efficiency, or cost parameter.

18. The system of claim 10, wherein temporarily suspending a normal operation of the memory system includes invoking a system management mode.

* * * * *